United States Patent [19]
Smith et al.

[11] Patent Number: 5,212,021
[45] Date of Patent: May 18, 1993

[54] ENERGY PACK AND INDIVIDUAL BATTERY CELL CARTRIDGE

[75] Inventors: Richard B. Smith, Bethel; Bruce McDonald, Weston, both of Conn.

[73] Assignee: Duracell Inc., Bethel, Conn.

[21] Appl. No.: 839,415

[22] Filed: Feb. 21, 1992

[51] Int. Cl.⁵ .............................................. H01M 2/10
[52] U.S. Cl. ......................................... 429/9; 429/99; 429/123
[58] Field of Search ........................ 429/9, 123, 96–100, 429/16.3, 159; 307/150; 320/6, 15; 361/380, 390, 392

[56] References Cited

U.S. PATENT DOCUMENTS

| | | | |
|---|---|---|---|
| 4,464,445 | 8/1984 | Matti | 429/100 X |
| 4,514,477 | 4/1985 | Kobayashi | 429/123 X |
| 4,636,703 | 1/1987 | Tohya et al. | 429/99 X |

Primary Examiner—Anthony Skapars
Attorney, Agent, or Firm—Ronald S. Cornell; James B. McVeigh, Jr.

[57] ABSTRACT

The present invention is directed to a cartridge comprising a rectangular base and four side walls which form a cavity into which an energy pack or a plurality of individual battery cells, either primary or secondary, are locatable. The cartridge is securable to an electrical apparatus by a latching mechanism. Alternatively, the cartridge can be integral therewith. In a first embodiment, a plurality of cells are locatable such that their positive and negative contacts are positioned against a set of positive and negative contact areas located along the first and second side walls. The first embodiment optionally comprises a contact arm, locatable substantially parallel to the second side wall, which includes a plurality of positive contact areas corresponding to and across from the negative contact areas located on the second side wall. A plurality of cells, having a shorter length than the battery cells locatable between the first and second side walls, are locatable between the contact arm and the second side wall. In a second embodiment, the cartridge includes first and second contact arms positionable substantially parallel to the third and fourth side walls, between the first and the second side walls. The plurality of battery cells are locatable between the third side wall and the first contact arm, between the first and the second contact arm, and between the second contact arm and the fourth side wall. The cartridge also provides circuitry to recharge the energy pack and/or secondary cells located therein.

29 Claims, 6 Drawing Sheets

ENERGY PACK AND INDIVIDUAL BATTERY CELL CARTRIDGE

BACKGROUND OF THE INVENTION

1. Technical Field

The present invention is directed to a cartridge capable of accommodating either a first or a second energy source. More particularly, the present invention is directed to a cartridge capable of accommodating either an energy pack or a plurality of individual battery cells. The cartridge can be securable to an electrical apparatus, or integral therewith.

The present invention finds particular utility when used in conjunction with a portable electrical apparatus, such as a video camcorder, a cellular telephone, a computer, a toy or the like.

2. Background Information

An energy pack is a rechargeable energy storage device capable of storing energy for use by an electrical apparatus. Energy packs for use with video camcorders are well known in the art. For example, the Sony Corporation markets an energy pack under the tradename NP-55 for supplying energy to a Sony 8 mm video camcorder. Additionally, Panasonic, a division of Matsushita Electric Corporation of America, markets an energy pack under the tradename PV-BP15 for supplying energy to a Panasonic VHS video camcorder.

The energy packs are secured to their respective video camcorders in slightly different ways. Additionally, the contact points which electrically connect the energy packs to their respective video camcorders are positioned at different locations with respect to the two energy packs. Thus, the Sony NP-55 energy pack will not fit on or electrically connect to the Panasonic VHS video camcorder and the Panasonic PV-BP15 energy pack will not fit on or electrically connect to the Sony 8 mm video camcorder.

Both the NP-55 and the PV-BP15 are rechargeable energy packs which, when fully charged, provide their respective camcorder with a nominal 6 volt direct current (d.c.) energy source. Under normal operating conditions, a camcorder can operate several hours on a fully charged energy pack. In order to fully restore the charge, the energy pack must be placed in a recharger.

If the user desires to operate the camcorder after the energy pack has run too low for camcorder operation but before the energy pack has been recharged, the user must possess either a spare energy pack, an AC line converter or a separate cartridge attachable to the camcorder in which individual battery cells are placed. The cartridge is attachable to the camcorder in place of an energy pack and must be removed when reattaching the energy pack. It is not uncommon, however, for the user to have forgotten to bring the spare energy pack, the AC line converter and/or the battery cell cartridge, if indeed these have been obtained at all, when the main energy pack has run too low to operate the camcorder.

In addition to possessing a spare energy pack, the user must be sure that the spare energy pack is at least partially charged, thereby enabling further video camcorder operation. In addition to possessing an AC line converter, the user must be at an AC power source.

In order to recharge either the main or the spare energy pack, the user must have access to the energy pack recharger. However, it is not uncommon for the user to be at a location remote from the recharger. In addition to remembering to bring the recharger, the user must be at a location which provides access to a 110 VAC outlet to power the recharger. Further, the user must be at the location for at least a minimum time period in order to provide adequate time to recharge the energy pack.

In order to alleviate the problems associated with having to travel with a recharger, Motorola markets an energy pack having a built-in electrical connector for use with one of their hand-held cellular telephones. The built-in electrical connector allows the energy pack to be plugged directly into an electrical outlet for recharging. However, as with the video camcorder, the user must have access to a 110 VAC outlet for at least a minimum time period in order to recharge the energy pack. Additionally, unless the user has access to a spare energy pack, further cellular telephone usage is not possible.

SUMMARY OF THE INVENTION

Accordingly, it is an object of the present invention to provide a cartridge securable to an electrical apparatus, the cartridge being capable of accommodating either an energy pack or a plurality of individual battery cells to supply energy to the electrical apparatus.

It is another object of the present invention to provide a cartridge integral with an electrical apparatus, the cartridge being capable of accommodating either an energy pack or a plurality of individual battery cells to supply energy to the electrical apparatus.

Additionally, it is an object of the present invention to provide a cartridge which is capable of accommodating a plurality of different types of energy packs.

Further, it is an object of the present invention to provide a cartridge which is capable of accommodating a plurality of different types of battery cells.

In accordance with these and other objects, the present invention is directed to a cartridge which accommodates either an energy pack or a plurality of individual battery cells to supply energy to the electrical apparatus. The cartridge can either be distinct from the electrical apparatus, or integral therewith.

Where the cartridge is distinct from the electrical apparatus, the cartridge preferably comprises a substantially rectangular base having a longitudinal axis and four side walls integral therewith. The first and second side walls are aligned substantially parallel to the longitudinal axis of the base and the third and fourth walls are aligned substantially perpendicular thereto.

An interior side of the base and the four side walls form a cavity, the dimensions of which allow either an energy pack or a plurality of individual battery cells to be locatable therein. The cartridge is securable to the electrical apparatus by a latching mechanism which positions an exterior side of the cartridge to the electrical apparatus.

The exterior side of the base includes a positive and a negative contact area preferably positioned to correspond to the position of the positive contact and negative contact, respectively, of the electrical apparatus.

In order to electrically connect the energy pack to the electrical apparatus, the interior side of the base, within the cavity of the cartridge, includes a positive and a negative contact area preferably positioned to correspond to the position of the positive contact and negative contact, respectively, of an energy pack locatable within the cavity. The positive and negative contact areas on the interior side of the base are electrically connected to the positive and negative contact areas on the exterior side of the base, thereby electrically connecting the energy pack to the electrical apparatus.

A second set of positive and negative contact areas are preferably positioned on the interior side of the base, preferably positioned to correspond to the position of a positive contact and a negative contact, respectively, of a second type of energy pack. Thus, the cartridge of the present invention accommodates at least two different types of energy packs.

In a first embodiment, the cartridge further includes a plurality of positive and a plurality of negative contact areas preferably located on the first and second side walls, respectively. The plurality of battery cells are lonitudinally locatable within the cavity of the cartridge such that their individual positive and negative contacts are positioned against a set of positive and negative contact areas, respectively, located along the first and second side walls. The plurality of positive and negative contact areas located on the first and second side walls are preferably electrically connected such that the plurality of battery cells are electrically connected to each other in series, terminating in a positive and negative contact area.

In order to electrically connect the plurality of battery cells to the electrical apparatus, the terminal positive and negative contact areas of the series connection are preferably electrically connected to the positive and negative contact areas, respectively, located on the exterior side of the cartridge.

In addition to the positive and negative contact areas located on the first and second side walls of the cartridge, the first embodiment optionally comprises a contact arm locatable substantially parallel to the second side wall. The contact arm includes a plurality of positive contact areas corresponding to and substantially across from the negative contact areas located on the second side wall. A plurality of battery cells, having a shorter length than the battery cells locatable between the first and second side walls, are locatable between the positive contact areas on the contact arm and the negative contact areas on the second side wall. The contact arm is preferably locatable in a non-interfering location, substantially parallel to the fourth side wall, when not in use.

In a second embodiment, the cartridge further includes a first and a second contact arm, both contact arms are positionable substantially parallel to the third and fourth side walls, between the first and the second side walls. The plurality of battery cells are longitudinally locatable between the third side wall and the first contact arm, between the first and the second contact arm, and between the second contact arm and the fourth side wall.

In the second embodiment, a plurality of positive and negative contact areas are located on the third and fourth side walls and on both sides of the two contact arms. The plurality of positive and negative contact areas are positioned to correspond with the positive and negative contacts, respectively, on the plurality of individual battery cells. The plurality of positive and negative contact areas located on the third and fourth side walls and on the two contact arms are preferably electrically connected such that the plurality of battery cells are electrically connected to each other in series, terminating in a positive and a negative contact area.

In order to electrically connect the plurality of battery cells to the electrical apparatus, the terminal positive and negative contact areas of the series connection are preferably electrically connected to the positive and negative contact areas, respectively, located on the exterior side of the cartridge.

In the first and second embodiments discussed above, the cartridge of the present invention preferably further includes a connector and recharging circuitry to allow the cartridge to be connected to an electrical power source, e.g., 110 VAC, thereby allowing an energy pack or secondary battery cells located within the cavity of the cartridge to be recharged.

The connector associated with the recharging circuitry is preferably located on the exterior side of the base of the cartridge, and is therefore accessible only when the cartridge is removed from the electrical apparatus. Alternatively, or in addition thereto, another connector is locatable on a side of the cartridge, thereby providing access without having to remove the cartridge from the electrical apparatus.

In the preferred embodiment, either exclusively primary (i.e., non-rechargeable) or exclusively secondary (i.e., rechargeable) battery cells may be used. A user-activated switch is preferably provided to indicate whether primary or secondary cells are in the cartridge. To prevent primary cells located within the cavity of the cartridge from being inadvertently connected to the recharging power source, the user-activated switch electrically isolates the leads connected to the individual battery cells from the leads connected to the recharging circuitry when primary cells are used.

The cartridge can further comprise a device for indicating to a user the state of relative charge of either the energy pack or the individual battery cells taken collectively.

Where the cartridge is integral with the electrical apparatus, the side walls are integral with the electrical apparatus. The recharging circuitry, its associated connector and the state of charge indicator device can be located on one or more of the sides of the cartridge or on a surface of the electrical apparatus separate therefrom.

The cartridge of the present invention accommodates either an energy pack or a plurality of individual battery cells to supply energy to an electrical apparatus. Moreover, the cartridge of the present invention accommodates a plurality of different types of energy packs, as well as a plurality of different types of individual battery cells, including primary or secondary and different sizes thereof. The cartridge also provides circuitry to recharge the energy pack and/or secondary cells located therein. Thus, the cartridge of the present invention provides a greater degree of flexibility than that offered by an energy pack alone.

DESCRIPTION OF THE PREFERRED EMBODIMENT(S)

The present invention is directed to a cartridge capable of accommodating either an energy pack or a plurality of individual battery cells to supply energy to an electrical apparatus. The cartridge can be securable to an electrical apparatus, or integral therewith.

The present invention finds particular utility when used in conjunction with a portable electrical apparatus operable from a dc source. While the present invention is described with reference to a video camcorder and a cellular telephone, it is to be understood that the present invention is not so limited. The present invention is equally applicable with other portable electrical apparatus operable from a dc power source, including but not limited to radios, televisions and other types of receivers and/or transmitters, computers and other data storage, manipulation and/or retrieval devices, and toys.

Figure 1:
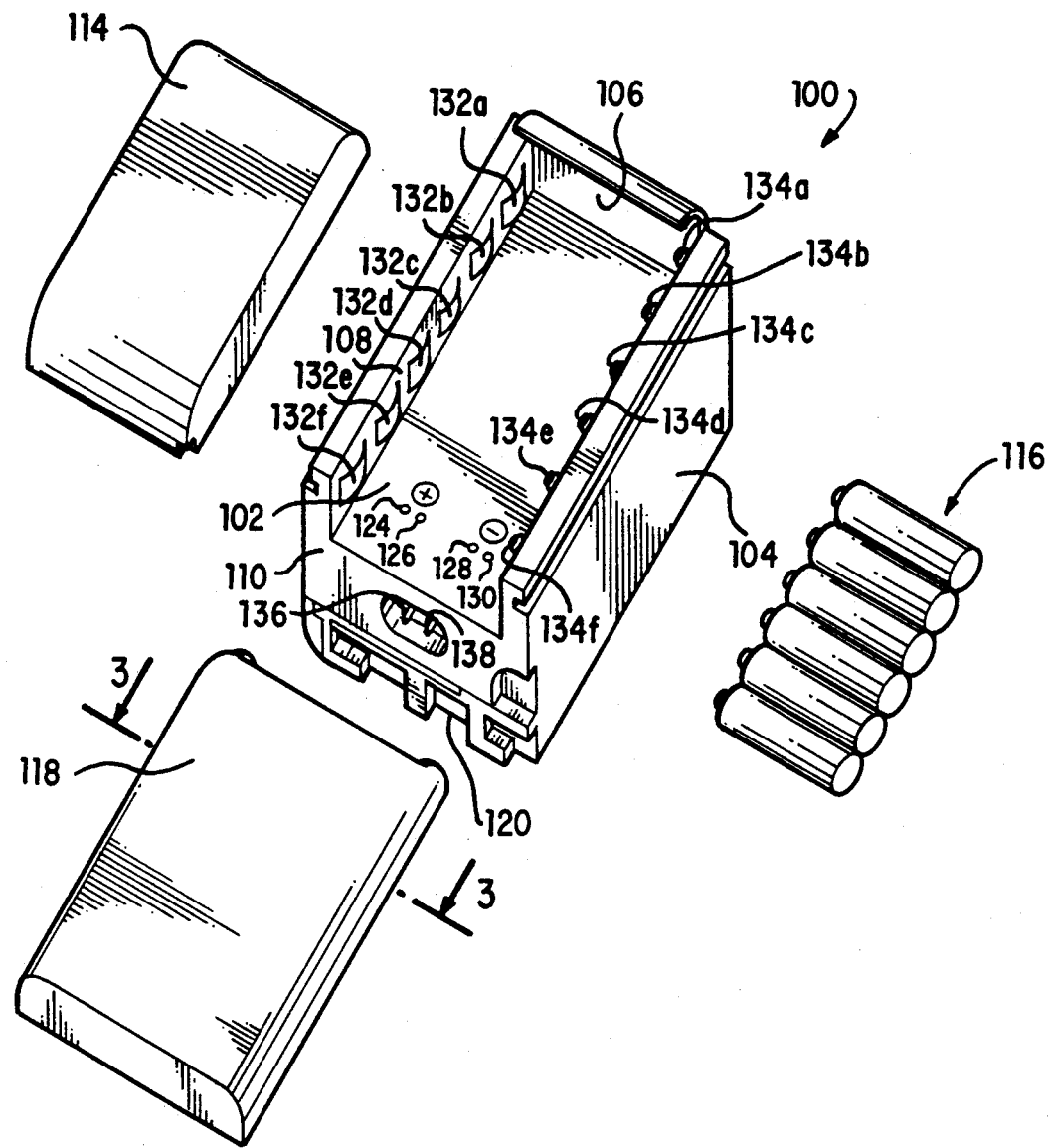
FIG. 1 illustrates an isometric projection of a preferred embodiment of the cartridge of the present invention.

Turning now to FIG. 1, an isometric projection of a preferred embodiment of the cartridge of the present invention is illustrated. Cartridge 100 comprises support base 102 and side walls 104, 106, 108 and 110 which together form cavity 112 capable of accommodating either energy pack 114 or a plurality of individual battery cells 116. Lid 118 is slidably locatable onto side walls 104 and 108 to retain the energy pack or the individual battery cells locatable therein. Locking mechanisms 120 and 122 (FIG. 4) allow the cartridge to be securely attached to an electrical apparatus, such as a video camcorder.

Figure 2:
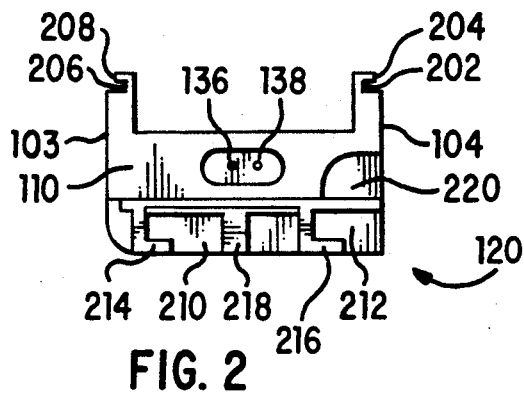
FIG. 2 is a first end view of the cartridge shown in FIG. 1.
Figure 3:
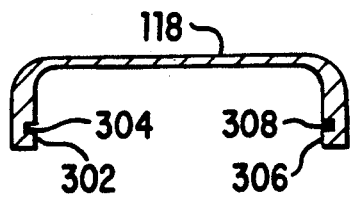
FIG. 3 is a sectional view of a lid for the cartridge taken at section 3—3 in FIG. 1.

FIG. 2 is an end view of cartridge 100 taken from side wall 110. FIG. 3 is a sectional view of lid 118 taken at section 3—3 in FIG. 1. With reference to FIGS. 2 and 3, side wall 104 preferably include recess 202 and rail 204 (FIG. 2) which correspond with rail 302 and recess 304, respectively, of lid 118 (FIG. 3). Similarly, side wall 108 preferably include recess 206 and rail 208 (FIG. 2) which correspond with rail 306 and recess 308, respectively, of lid 118 (FIG. 3). Alternatively, the lid can be hinged at two points, e.g., on side wall 104 or 106. Other arrangements for retaining the energy pack and/or the battery cells within the cavity of the cartridge will be obvious to those skilled in the art, including but not limited to full or partial covers, strap(s) and clip(s).

Figure 4:
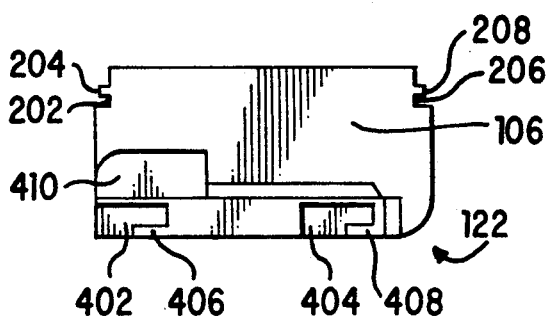
FIG. 4 is a second end view of the cartridge of FIG. 1.

FIG. 4 is an end view of cartridge 100 taken from side wall 106. With reference to FIG. 2, locking mechanism 120 preferably includes recesses 210 and 212 and interlocking legs 214 and 216. Similarly, with reference to FIG. 4, locking mechanism 122 preferably includes recesses 402 and 404 and interlocking legs 406 and 408.

Figure 5:
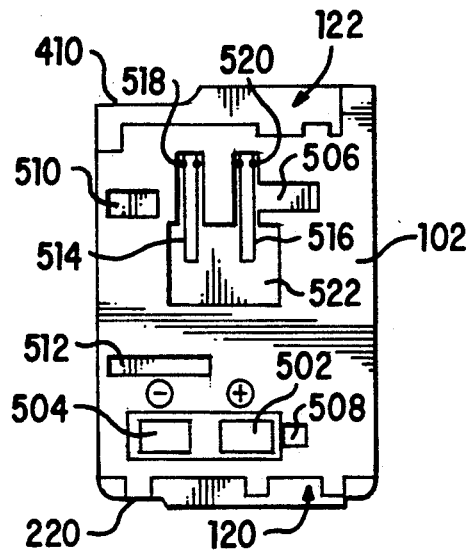
FIG. 5 is a bottom view of the cartridge of FIG. 1.

FIG. 5 is a bottom view of the cartridge of FIG. 1. With reference to FIG. 5, the bottom of support base 102 includes positive contact area 502, negative contact area 504, and recessed areas 506, 508, 510 and 512.

Figure 6:
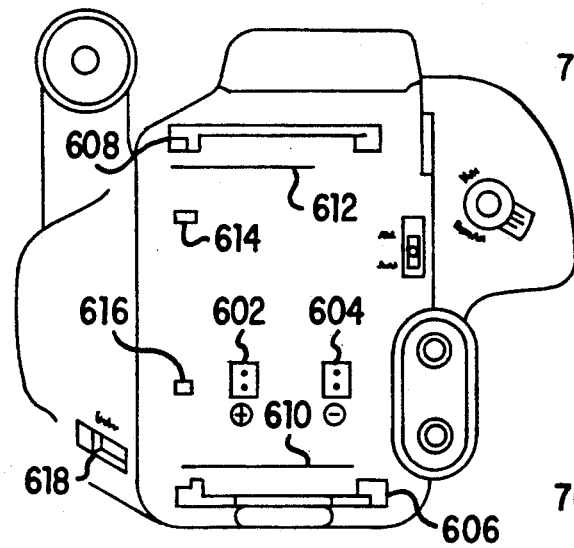
FIG. 6 is an end view of a Sony brand 8 mm video camcorder.

FIG. 6 is an end view of a Sony brand 8 mm video camcorder. With reference to FIG. 6, the Sony brand camcorder includes positive contact area 602, negative contact area 604 and interlocking mechanisms 606 and 608. The bottom surface of base 102, shown in FIG. 5, attaches to the Sony brand video camcorder via positioning interlocking mechanisms 120 and 606 adjacent each other, positioning interlocking mechanisms 122 and 608 adjacent each other, and then slidably engaging the interlocking mechanisms of the cartridge from left to right into locking engagement with the adjacent interlocking mechanisms of the camcorder. Ridge 218 (FIG. 2) is preferably included to aid the initial positioning of the cartridge on the video camcorder.

Raised surfaces 610 and 612 help to reduce the surface friction, as well as to aid interlocking. The position of positive and negative contact areas 502 and 504 on the cartridge correspond with the position of positive and negative contact areas 602 and 604, respectively, on the Sony brand video camcorder.

The Sony brand camcorder also includes post 614 integral with the camcorder and post 616, retractable via movement of sliding button 618. The cartridge includes recessed areas 506 and 508 whose positions correspond with the positions of posts 614 and 616, respectively. When the cartridge is locked onto position, posts 614 and 616 are engaged in recesses 506 and 508, respectively, precluding unintentional cartridge removal. In order to remove the cartridge, sliding button 618 must be moved, retracting post 616 from recessed area 508, thereby allowing the cartridge to be unlocked.

Figure 7:
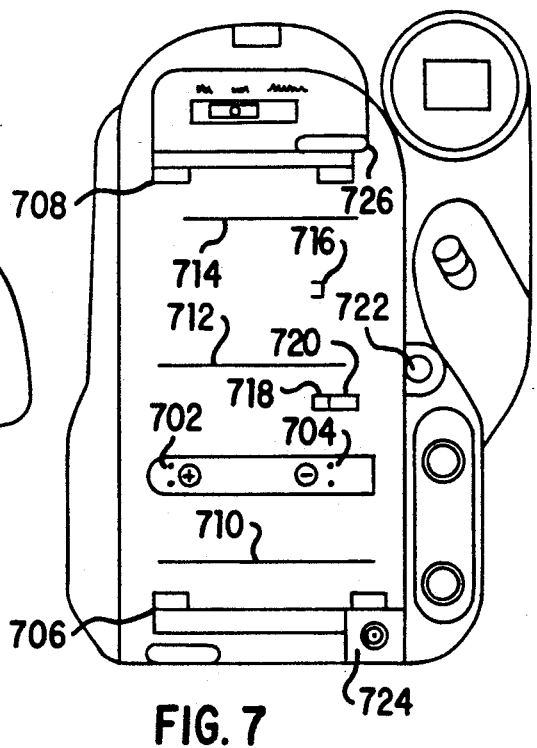
FIG. 7 is an end view of a Panasonic brand VHS video camcorder.

FIG. 7 is an end view of a Panasonic brand VHS video camcorder. With reference to FIG. 7, the Panasonic brand camcorder includes positive contact area 702, negative contact area 704 and interlocking mechanisms 706 and 708. The bottom surface of base 102, shown in FIG. 5, attaches to the Panasonic brand video camcorder via slidably engaging interlocking mechanisms 120 with 706, and interlocking mechanisms 122 with 708, as explained above with reference to the Sony brand video camcorder.

Raised surfaces 710, 712 and 714 help to reduce the surface friction, as well as to aid interlocking. The position of positive and negative contact areas 502 and 504 on the cartridge correspond with the position of positive and negative contact areas 702 and 704 on the Panasonic brand video camcorder.

The Panasonic brand camcorder also includes posts 716 and 718 integral with the camcorder and post 720, retractable via depression of button 722. The cartridge includes recessed areas 510 and 512 whose positions correspond with the positions of posts 716 and 718-720, respectively. When the cartridge is locked onto position, posts 716 and 718, 720 are engaged in recesses 510 and 512, respectively, precluding unintentional cartridge removal. In order to remove the cartridge, button 722 must be depressed, retracting post 720 from recessed area 512, thereby allowing the cartridge to be unlocked.

The cartridge preferably also includes recess 220 (FIGS. 2 and 5) which allows the cartridge to be positioned without interfering with the surface of dc input connector 724. Additionally, the cartridge preferably also includes recess 410 (FIGS. 4 and 5) which allows the cartridge to be positioned without interfering with carrying strap ring 726.

It is to be noted that the positive and negative contact areas on the Sony brand and the Panasonic brand video camcorders are located at different positions with respect to each other, as are posts 614, 616 and posts 716-720. Thus, a Sony NP-55 energy pack cannot be mounted on or be electrically connected to a Panasonic brand camcorder, and a Panasonic PV-BP15 energy pack cannot be mounted on or be electrically connected to a Sony brand camcorder.

However, on the cartridge of FIG. 1, positive contact area 502 is preferably wide enough to contact both positive contact areas 602 and 702 on the Sony brand and the Panasonic brand video camcorder, respectively. Similarly, negative contact area 504 on the cartridge is preferably wide enough to contact both negative contact areas 604 and 704 on the Sony brand and the Panasonic brand video camcorder, respectively.

Additionally, the cartridge preferably includes recesses 506-512 to accommodate posts 614, 616 and 716-720. Thus, contacts 502 and 504, as well as recesses 506-512, allow the cartridge of FIG. 1 to be locatable on either a Sony brand or a Panasonic brand video camcorder.

Returning now to FIG. 1, the cartridge of the present invention allows either an energy pack or a plurality of individual battery cells to be located within cavity 112. To supply energy from an energy pack to the video camcorder, the cartridge further comprises positive contact posts 124 and 126 and negative contact posts 128 and 130. Positive contact posts 124 and 126 are electrically connected to positive contact area 502 (FIG. 5). Similarly, negative contact posts 128 and 130 are electrically connected to negative contact area 504 (FIG. 5).

Positive and negative contact posts 124 and 130, respectively, are preferably located such that their positions correspond to the positions of the positive and negative contact areas, respectively, on the Panasonic PV-BP15 energy pack. Similarly, positive and negative contact posts 126 and 128, respectively, are preferably located such that their relative positions correspond to the positions of the positive and negative contact areas, respectively, on the Sony NP-55 energy pack. Thus, regardless of whether the cartridge of the present invention is located on a Sony brand or a Panasonic brand video camcorder, either the NP-55 or the PV-BP15 energy pack will be acceptable.

In the preferred embodiment, posts 124-130 are retractable and spring-biased to provide urged contact with their respective positive and negative contact areas on an energy pack. Other positive and negative contacting arrangements will be obvious to those skilled in the art, including but not limited to a larger plurality of individual retractable posts located over a larger surface area to accommodate other energy pack configurations, and a single positive and a single negative contacting arrangement whose respective widths can accommodate various energy pack configurations.

In addition to an energy pack, the cartridge of the present invention can also accommodate individual battery cells. Battery cells having various chemical compositions are well known in the art. Common types of commercially available non-rechargeable battery cells, often referred to as primary cells, include zinc-carbon (ZnC) and alkaline. Common types of commercially available rechargeable battery cells, often referred to as secondary cells, include nickel-cadmium (NiCd) and nickel-metal-hydride (NiMH).

Figure 8:
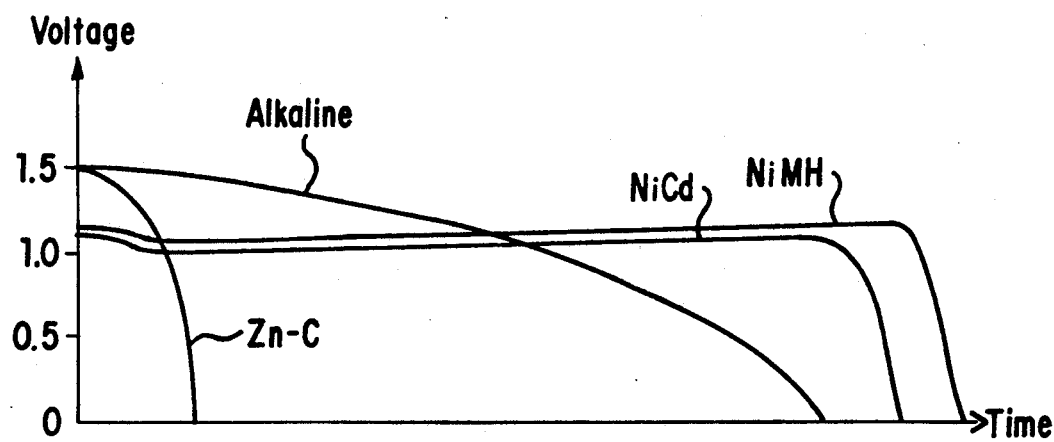
FIG. 8 is a chart illustrating the performance of several types of battery cells over time.

FIG. 8 is a chart illustrating the performance over time of size AA battery cells having various chemical compositions. With reference to FIG. 8, both the zinc-carbon and the alkaline cells have an initial potential of about 1.5 volts, falling off in a substantially linear fashion. However, the zinc-carbon cell has a relatively shorter service life, relative to the alkaline cell. The nickel-cadmium cell has an initial potential of about 1.2 volts, quickly falling off to a stable voltage of about 1.1 volts for most of its service life. Similarly, the nickel-metal-hydride cell has an initial potential of about 1.25 volts, quickly falling off to a stable voltage of about 1.1 volts for most of its service life. As known in the art, the service life of an alkaline cell is very dependent on load conditions such as drain rate; the higher the drain rate, the shorter the service life. The service life of nickel-cadmium or nickel-metal-hydride cells, on the other hand, are substantially independent of load.

The video camcorders of FIGS. 6 and 7 operate on a nominal 6 volt dc source. Thus, four 1.5 volt, size AA alkaline cells or five 1.2 volt, size AA nickel-cadmium cells could be used. It is advantageous, however, to increase the number of cells, thereby providing increased service life to the electrical apparatus. Accordingly, six alkaline or six nickel-cadmium cells are preferably locatable within the cavity of the cartridge of the present invention. Alkaline cells are preferred where cell-rechargeability is not a factor; nickel-cadmium cells are preferred where cell-rechargeability is desired. It will be obvious to those skilled in the art that different cell chemistries and/or either a greater or lesser number of cells can be used.

To supply energy from the individual battery cells to the video camcorder and with reference to FIG. 1, the cartridge further comprises positive contact areas 132a-f and negative contact areas 134a-f. The positive and negative contact areas are preferably positioned directly across from each other such that an individual battery cell is locatable within cavity 112, between a positive and a negative contact area, e.g., 132a and 134a, respectively.

The individual battery cells are preferably positioned within the cavity such that all of their positive contact surfaces faces side wall 108 and all of their negative contact surfaces face side wall 104. Accordingly, positive contact areas 132 are preferably located on side wall 108 and negative contact areas 134 are preferably located on side wall 104, as shown in FIG. 1. Other positions for, number of and type of individual battery cells locatable within the cavity will be obvious to those skilled in the art.

Positive contact areas 132 preferably comprise individually positioned, substantially rectangular metallic strips, e.g., copper, whose center portion is slightly bowed away from side wall 108, creating a resilient surface for the positive contact area of an individual battery cell to be positioned thereagainst. Negative contact areas 134 preferably comprise individually positioned, substantially conical metallic springs, creating a resilient surface for the negative contact area of an individual battery cell to be positioned thereagainst. Other types of positive and/or negative contact areas for the individual battery cells will be obvious to those skilled in the art.

Figure 9:
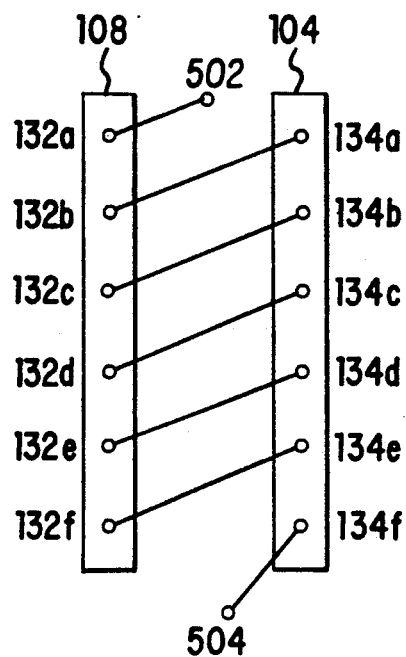
FIG. 9 is a schematic diagram illustrating a preferred embodiment of connecting the individual battery cells in series, wherein all of the battery cells face the same direction.

In order to supply the video camcorder with its requisite d.c. volt source, positive contact areas 132 and negative contact areas 134 are preferably electrically connected such that the battery cells are connected together in series. FIG. 9 is a schematic diagram illustrating a preferred embodiment of connecting the individual battery cells in series, wherein all of the battery cells face the same direction.

Figure 10:
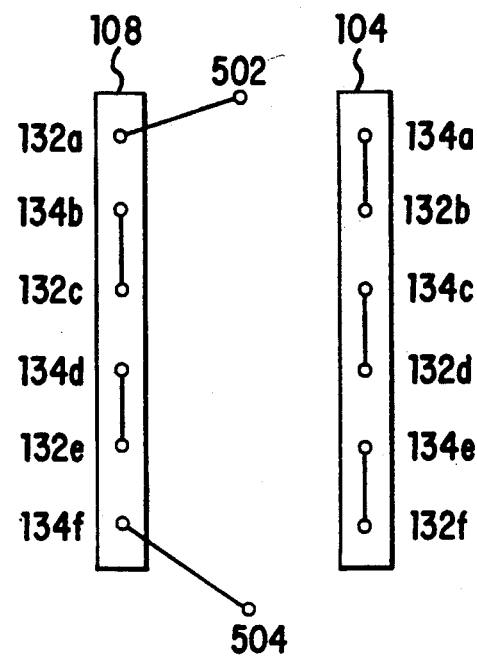
FIG. 10 is a schematic diagram illustrating a preferred embodiment of connecting the individual battery cells in series, wherein the battery cells are positioned in alternating directions.

Alternatively, the individual battery cells can be positioned such that their positive and negative contact surfaces are positioned in alternating directions within the cartridge. FIG. 10 is a schematic diagram illustrating a preferred embodiment of connecting the individual battery cells in series, wherein the battery cells are positioned in alternating directions. Other battery cell arrangements and/or electrical interconnections will be obvious to those skilled in the art.

The cartridge of the present invention preferably further includes recharging circuitry and a connector for connection to an electrical power source, e.g., 110 VAC, thereby allowing an energy pack or secondary cells located within the cavity of the cartridge to be recharged.

With reference to FIG. 5, the connector preferably comprises prongs 514 and 516 rotatably mounted about pins 518 and 520, respectively. Prongs 514 and 516 preferably are rotatable about 90° from a position substantially perpendicular with respect to the base, allowing prongs 514 and 516 to be plugged into an a.c. outlet, to a position within recess 522, allowing prongs 514 and 516 to be retractable therein when not in use. Recess 522 is preferably dimensioned to allow a user easy access to prongs 514 and 516.

Figure 11:
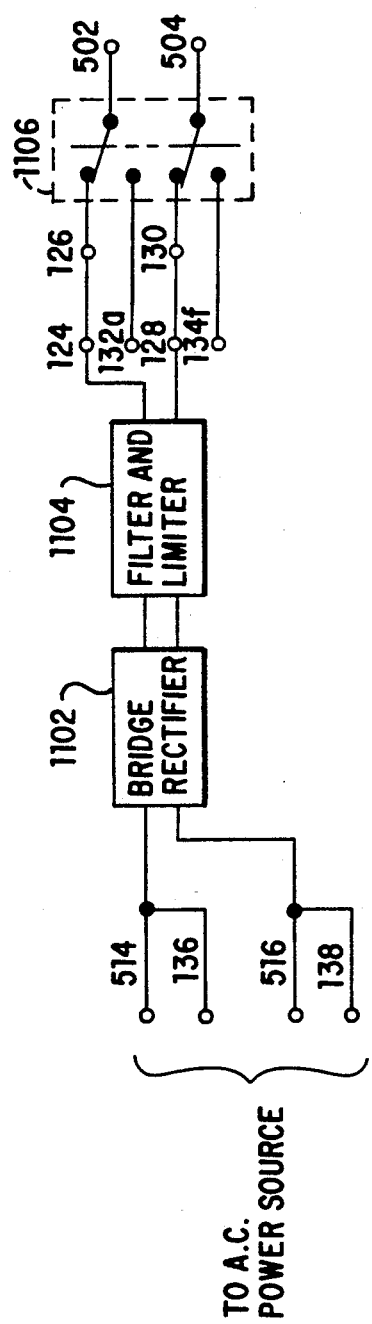
FIG. 11 is a schematic diagram of a preferred embodiment of a recharging circuit for use in the cartridge of FIG. 1.

The present invention provides for the exclusive use of primary cells and/or the exclusive use of secondary cells. FIG. 11 is a schematic diagram of a preferred embodiment of a recharging circuit for use in the cartridge of the present invention, wherein exclusively primary cells are to be located within the cavity of the cartridge. Prongs 514 and 516 (FIG. 5) are preferably electrically connected to positive and negative contact areas 502 and 504, respectively, via appropriate ac-to-dc converting circuitry, such as a diode bridge rectifier circuit 1102 and filter and limiter circuit 1104. Various rectifier circuits and filter and limiter circuits are well known in the art.

As is known in the art, it is not recommended that primary cells be connected to a recharging power source. Accordingly, switch 1106 is preferably provided to electrically isolate leads 132a and 134f connected to the battery cells from the leads connected to the energy pack via positive contact posts 124 and 126 and negative contact posts 128 and 130. In this way, the primary cells located within the cavity of the cartridge will not be inadvertently connected to the recharging power source.

Figure 11B:
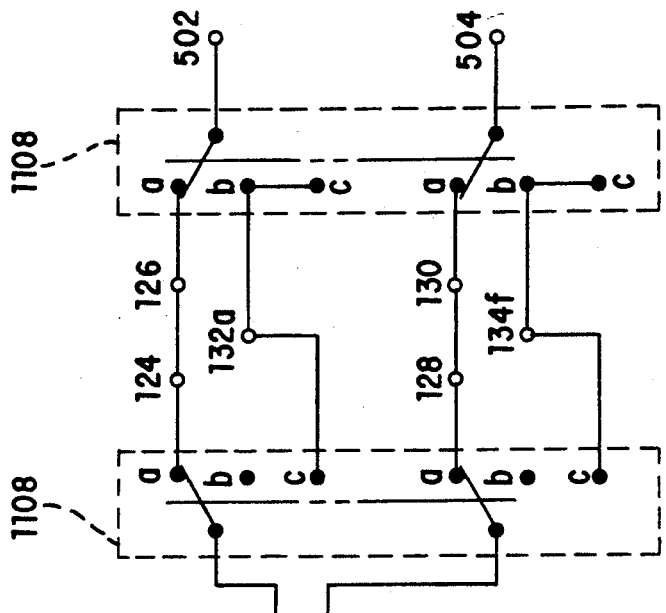
FIG. 11B is a partial schematic diagram of a third preferred embodiment of a recharging circuit for use in the cartridge of FIG. 1.
Figure 11A:
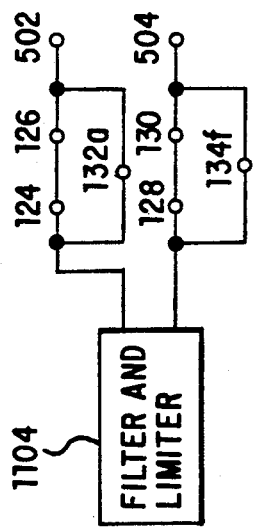
FIG. 11A is a partial schematic diagram of a second preferred embodiment of a recharging circuit for use in the cartridge of FIG. 1.

FIG. 11A is a partial schematic diagram of a preferred embodiment of a recharging circuit for use in the cartridge of the present invention, wherein exclusively secondary cells are to be located within the cavity of the cartridge. Since only rechargeable cells are to be located within the cartridge, leads 132a and 134f need not be electrically isolated from the recharging power source. Thus, leads 132a and 132f are electrically connected directly to the recharging power source provided at the output of filter and limiter circuit 1104.

FIG. 11B is a partial schematic diagram of a preferred embodiment of a recharging circuit for use in the cartridge of the present invention, wherein either exclusively primary or exclusively secondary cells can be located within the cavity of the cartridge. Preferably, multi-pole, multi-throw switch 1108 has three-positions accessible by the user to indicate whether an energy pack (position a), primary cells (position b) or secondary cells (position c) are located within the cavity of the cartridge. Positions a and c allow the recharging power source provided at the output of circuit 1104 to be supplied to the energy pack and secondary cells, respectively. Position b electrically isolates the recharging power source from primary cells. Optionally, a transformer (not shown) can be included in the recharging circuit of FIGS. 11, 11A and/or 11B to decrease the amount of time necessary to fully charge the energy pack and/or the secondary cells.

Other ac-to-dc converting circuitry, electrical and/or switching arrangements will be obvious to those skilled in the art.

Prongs 514 and 516 (FIG. 5) allow an energy pack and/or secondary cells located within the cavity of the cartridge to be recharged when the cartridge is removed from the video camcorder. With reference to FIGS. 1 and 11, prongs 136 and 138 can be provided, either instead of or in addition to, prongs 514 and 516, to allow an energy pack and/or secondary cells to be recharged without having to remove the cartridge from the video camcorder. In addition to recharging, prongs 136 and 138 and prongs 514 and 516 also allow the video camcorder to be operated directly from an a.c. power source.

With reference to FIG. 1, prongs 136 and 138 are preferably housed within a recess in a side surface of support base 102 contiguous with side wall 110, and are connectable to an a.c. outlet via a two-conductor cord (not shown) having a two-prong male connector at one end for connection to an a.c. outlet, and a two-prong female connector at the other end for connection to prongs 136 and 138. Other connector designs and/or placements of prongs 136, 138, 514 and 516 will be obvious to those skilled in the art.

The cartridge of the present invention can further comprise a device (not shown) for indicating to a user the state of relative charge of either the energy pack or the individual battery cells taken collectively. The device can indicate the state of charge via, for example, a green light emitting diode (LED) which remains illuminated when charge is satisfactory, a red LED which illuminates and/or flashes when charge is low, a plurality of LED's which indicate state of charge based on how many of the LED's are illuminated, or a liquid crystal display (LCD) which indicates state of charge based on how much of the display is illuminated. Various state of charge devices are well known in the art.

The present invention has thus far been described with reference to size AA battery cells. Other cell sizes, however, can be used. For example, a lithium type battery cell is a primary cell having an initial potential of about 3 volts. A common size of a commercially available, 3 volt lithium battery cell is ⅔ A, which is a cell having the same circumference as a size A cell, but two-thirds the height thereof. Accordingly, a video camcorder can operate on two 3 volt lithium cells. As will be appreciated by those skilled in the art, a third cell would extend the service life of the device.

Figure 12:
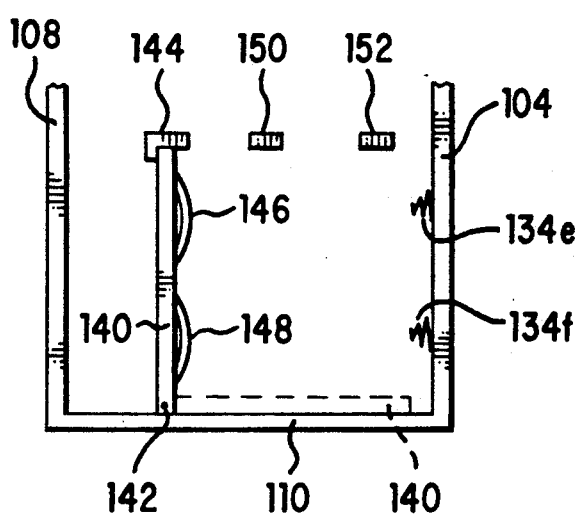
FIG. 12 illustrates a partial top view of the cartridge of FIG. 1, including an optional two-cell arrangement.

FIG. 12 illustrates a partial top view of the cartridge of FIG. 1, including an optional two-cell arrangement. With reference to FIG. 12, two-cell contact arm 140 is preferably positioned adjacent side wall 110 of the cartridge when not in use. Should a user desire to employ two 3 volt cells, contact arm 140 pivots substantially 90° about pin 142 to contact arm support 144.

Two 3 volt cells are preferably positioned within the cavity such that their positive contact surfaces face contact arm 140 and their negative contact surfaces face side wall 104. Accordingly, positive contact areas 146 and 148 are preferably located on contact arm 140, positioned to correspond with negative contact areas 134e and 134f, respectively. Cells having a different cell chemistry, size, voltage and/or either a greater or lesser number of cells to be used will be obvious to those skilled in the art.

Positive contact areas 146 and 148 preferably comprise individually positioned, substantially rectangular metallic strips, e.g., copper, whose center portion is slightly bowed away from contact arm 140, creating a resilient surface for the positive contact area of an individual battery cell to be positioned thereagainst. Other types of positive contact areas will be obvious to those skilled in the art.

In the preferred embodiment, side wall 110 includes a recessed area (not shown) corresponding to contact areas 146, 148 on contact arm 140. The recessed area in side wall 110 allows the contact arm to be positioned in abutting fashion with side wall 110 by providing a space for contact areas 146, 148 when contact arm 140 is positioned thereagainst.

Cell supports 150 and 152 are preferably provided to preclude movement of the cells, thereby retaining the relative position of the cells between contact arm 140 and side wall 104. In the preferred embodiment, contact arm support 144 and cell supports 150 and 152 are retractably spring-biased, retracting when either an energy pack is located thereon or another cell arrangement is employed. Other arrangements, including but not limited to flip-up cell supports, will be obvious to those skilled in the art.

Figure 13:
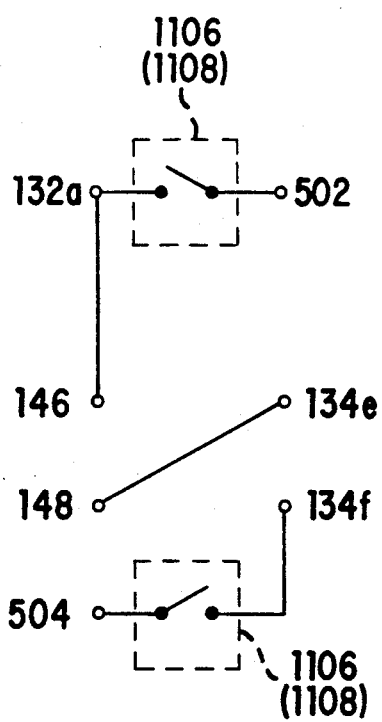
FIG. 13 is a schematic diagram illustrating a preferred embodiment of connecting in series the cells to be used in FIG. 12.

In the preferred embodiment, contact areas 146 and 148 are electrically connected such that the two 3 volt cells are in series with each other, thereby providing the requisite dc source to the video camcorder. FIG. 13 is a schematic diagram illustrating a preferred embodiment of connecting in series the cells to be used in FIG. 12. With reference to FIG. 13, positive contact area 148 is preferably electrically connected to negative contact area 134e, while positive contact area 146 is preferably electrically connected to positive contact area 132a. Switch 1106 (1108) allows the user to control recharging, as discussed above with reference to FIG. 11 (FIG. 11B). Other electrical interconnections will be obvious to those skilled in the art.

Figure 14:
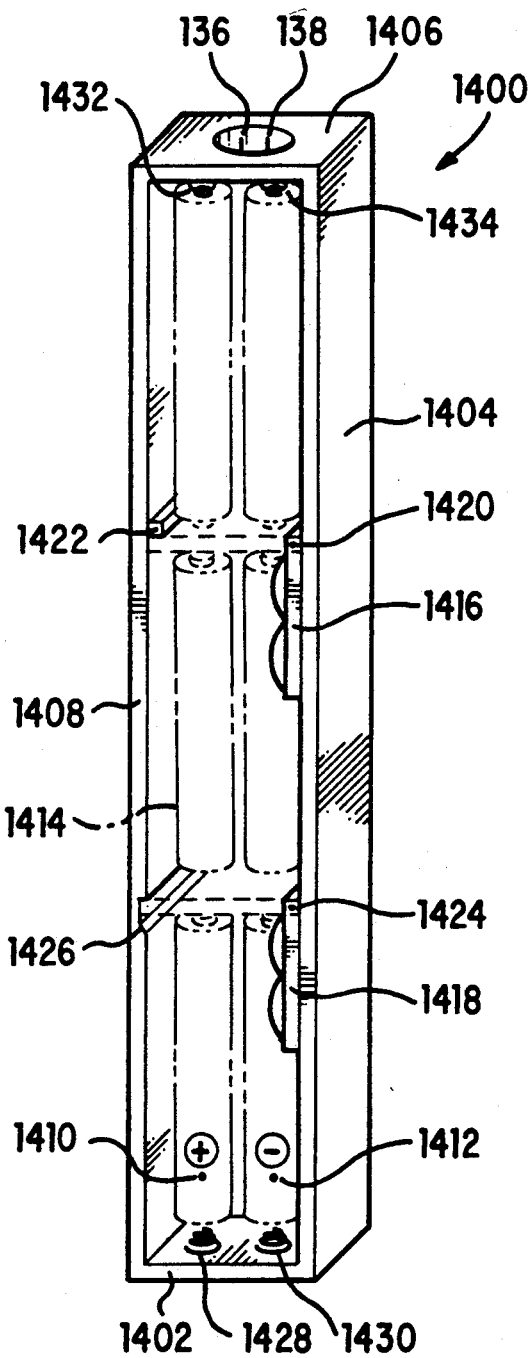
FIG. 14 illustrates a partial isometric projection of another preferred embodiment of the cartridge of the present invention.

Energy packs for use by other portable electrical apparatus, such as cellular telephones, are typically substantially narrower and longer than those for use by, e.g., video camcorders. FIG. 14 illustrates a partial isometric projection of another preferred embodiment of the cartridge of the present invention.

With reference to FIG. 14, cartridge 1400 comprises a support base and side walls 1402-1408 integral therewith which together form a cavity capable of accommodating either an appropriately shaped energy pack or a plurality of cells. Cartridge 1400 preferably includes a lid (not shown) to retain the energy pack or cells locatable in the cavity, as well as suitable locking mechanisms (not shown) to secure the cartridge to the cellular telephone. Additionally, the bottom of the support base of cartridge 1400 preferably comprises a positive and a negative contact area (not shown), the positions of which preferably correspond to the positions of the positive and negative contact areas, respectively, of the cellular telephone.

The locking mechanisms and the positions of the positive and negative contact areas are preferably disposed to accommodate a plurality of different types of cellular telephones, as discussed above with reference to the cartridge of FIG. 1.

To supply energy from an energy pack located in the cavity of cartridge 1400 to the electrical appliance to which it is attached, cartridge 1400 further comprises positive contact post 1410 and negative contact post 1412, which are electrically connected to the positive and negative contact areas, respectively, located on the bottom of the support base.

Positive and negative contact posts 1410 and 1412, respectively, are preferably located such that their relative positions correspond to the positions of the positive and negative contact areas, respectively, of an energy pack to be located within the cavity of cartridge 1400. In the preferred embodiment, posts 1410 and 1412 are retractable and spring-biased to provide urged contact with their respective positive and negative contact areas on an energy pack. Other positive and negative contacting arrangements will be obvious to those skilled in the art.

A hand-held cellular telephone typically operates on a nominal 6 volt dc source. Thus, as discussed above with reference to the cartridge of FIG. 1, six size AA alkaline or six nickel-cadmium cells are preferably locatable within the cavity of cartridge 1400. The six cells are preferably positioned therein as shown by cell outlines 1414 located in the cavity.

Cartridge 1400 further comprises contact arms 1416 and 1418 preferably positioned adjacent side wall 1404 of the cartridge when not in use. Contact arm 1416 pivots substantially 90° about pin 1420 to first type of contact arm support 1422; contact arm 1418 pivots substantially 90° about pin 1424 to second type of contact arm support 1426 integral with side wall 1408. Other types of contact arms supports will be obvious to those skilled in the art.

Side wall 1404 preferably includes a recessed area adjacent each contact arm. The recessed areas in side wall 1404 allow the contact arms to be positioned in abutting fashion with side wall 1404 by providing a space for the two contact areas (not shown) located on the side of each contact arm adjacent side wall 1404 when the contact arms are positioned thereagainst.

To supply energy from the cells to the cellular telephone, contact arms 1416 and 1418 each preferably include two contact areas on each side thereof. Additionally, conical springs 1428, 1430 and 1432, 1434 are preferably provided on side walls 1402 and 1406, respectively. As discussed above with reference to the cartridge of FIG. 1, the contact areas located on contact arms 1416 and 1418 preferably comprise individually positioned, substantially rectangular metallic strips whose center portion is slightly bowed, creating a resilient surface for the respective contact area of the cell to be positioned thereagainst. Other types of contact areas for the cells will be obvious to those skilled in the art.

As cellular telephones typically operate on a nominal 6 volt dc source, the contact areas and conical springs which electrically contact the cells are preferably electrically connected together in series. In the preferred embodiment, six alkaline or six nickel-cadmium size AA cells are preferably locatable within the cavity of cartridge 1400. Cells having a different cell chemistry and-/or either a greater or lesser number of cells to be used will be obvious to those skilled in the art. For example, two 3 volt lithium cells may be used, positionable, e.g., between side wall 1406 and a contact arm (not shown) pivotal about side wall 1408.

As discussed above with reference to the cartridge of FIG. 1, cartridge 1400 preferably further includes recharging circuitry and a connector for connection to an electrical power source, e.g., 110 VAC, thereby allowing an energy pack or secondary cells located within the cavity of cartridge 1400 to be recharged. Thus, prongs (not shown) are preferably rotatably mounted on the back of the support base of cartridge 1400 and retractable within a suitable recess therein. Additionally, prongs (not shown) can be provided on the side of cartridge 1400, either instead of or in addition to, the prongs located on the back thereof.

Additionally, as discussed above with reference to the cartridge of FIG. 1, cartridge 1400 can comprise a device (not shown) to indicate the state of relative charge of either the energy pack or the collective state of charge of the battery cells.

In FIGS. 1 through 14, the cartridge of the present invention is illustrated distinct from an electrical apparatus. Electrical connection from the power source (e.g., an energy pack or battery cells) to the electrical apparatus is preferably via the positive and negative contact areas located on the exterior side of the base of the cartridge.

The cartridge of the present invention can also include an optional power source connector (not shown) located, e.g., in a recess of the support base integral with a side wall of the cartridge, and electrically connected to the positive and negative contact areas located on the exterior side of the base of the cartridge. The optional power source connector would enable, e.g., the power source located within the cartridge to be electrically connected to apparatus which is not suited for connection thereto via the contact areas located on the exterior side of the base.

Figure 15:
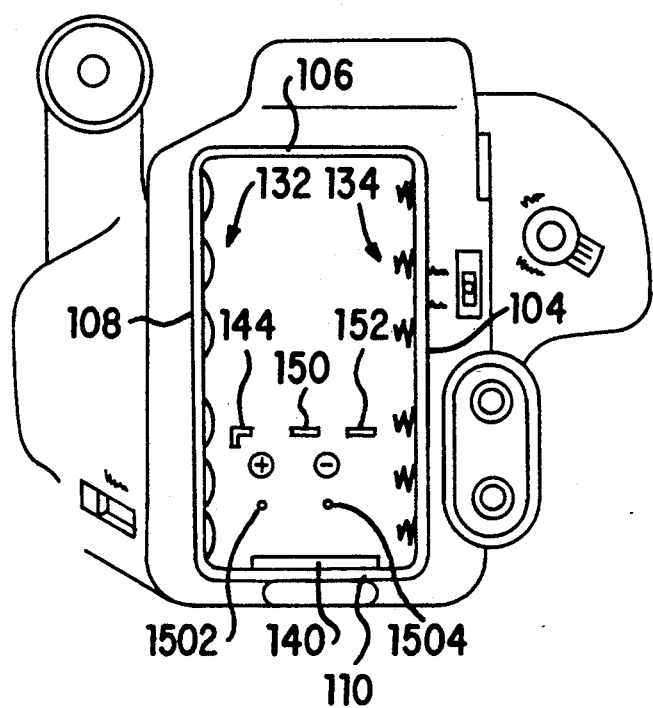
FIG. 15 illustrates the cartridge of FIG. 1 integral with the video camcorder of FIG. 6.

In FIG. 15, the cartridge of the present invention is illustrated integral with an electrical apparatus. Specifically, FIG. 15 illustrates the cartridge of FIG. 1 integral with the video camcorder of FIG. 6.

With reference to FIG. 15, side walls 104–110 are integral with the video camcorder. Contact areas 1502 and 1504 are electrically connected to the positive and negative contacts, respectively, of the camcorder. The recharging circuitry, connector(s) to an a.c. power supply and a state of charge indicator device can be located, for example, on one or more of the side walls, or on a surface of the electrical apparatus separate therefrom.

The cartridge of the present invention accommodates either an energy pack or a plurality of individual battery cells to supply energy to an electrical apparatus. Moreover, the cartridge of the present invention accommodates a plurality of different types of energy packs, as well as a plurality of different types of individual battery cells, including primary or secondary and different sizes thereof. The cartridge also provides circuitry to recharge the energy pack and/or secondary cells located therein. Thus, the cartridge of the present invention provides a greater degree of flexibility than that offered by an energy pack alone.

Although illustrative embodiments of the present invention have been described in detail with reference to the accompanying drawings, it is to be understood that the invention is not limited to those precise embodiments. Various changes or modifications may be effected therein by one skilled in the art without departing from the scope or spirit of the invention.

What we claim as our invention is:

1. A cartridge capable of accommodating either an energy pack or at least one individual battery cell to supply energy to an electrical apparatus having a positive contact and a negative contact, said cartridge comprising:
    a housing having a cavity capable of accommodating the energy pack;
    first contact means on an exterior portion of said housing adapted to mate with the positive and negative contacts of the electrical apparatus;
    second contact means on a first interior portion of said housing within the cavity, said second contact means electrically connected to said first contact means and adapted to mate with contacts on the energy pack;
    third contact means on a second interior portion of said housing within the cavity, said third contact means electrically connected to said first contact means and adapted to mate with contacts on the at least one battery cell; and
    means for releasably attaching said housing to the electrical apparatus.

2. The cartridge of claim 1, said cartridge further comprising means for recharging an energy pack located in the cavity.

3. The cartridge of claim 1, said cartridge further comprising means for recharging battery cells located in the cavity.

4. A cartridge capable of accommodating either an energy pack or a plurality of individual battery cells to supply energy to an electrical apparatus having a positive contact and a negative contact, said cartridge comprising:
    a housing having first, second, third and fourth side walls forming a cavity capable of accommodating the energy pack;
    a first and a second contact area located on said housing, the position of said first and said second contact areas corresponding to the position of the positive contact and negative contact, respectively, of the electrical apparatus;

a third and a fourth contact area located on said housing within the cavity, said third and fourth contact areas electrically connected to said first and said second contact areas, respectively, the position of said third and said fourth contact areas corresponding to the position of a positive contact and a negative contact, respectively, of the energy pack locatable within the cavity;

a plurality of fifth contact areas and a plurality of sixth contact areas located on said first and second side walls, the plurality of individual battery cells are locatable within the cavity between said first and second side walls such that a positive and a negative contact on each of the individual battery cells are positionable against one of the plurality of said fifth and sixth contact areas, respectively, wherein the plurality of fifth and sixth contact areas are electrically connected such that the plurality of cells are electrically connected to each other in series, terminating in a positive and a negative contact area electrically connected to said first and said second contact areas, respectively; and a locking mechanism for securely positioning said housing to the electrical apparatus.

5. The cartridge of claim 4, said cartridge further comprising:
a device to retain the energy pack or the individual battery cells within the cavity.

6. The cartridge of claim 4, said cartridge further comprising means for recharging an energy pack located in the cavity.

7. The cartridge of claim 4, said cartridge further comprising means for recharging battery cells located in the cavity.

8. The cartridge of claim 4, said cartridge further comprising:
a seventh and an eighth contact area located on said housing within the cavity, said seventh and eighth contact areas electrically connected to said third and said fourth contact areas, respectively, the position of said seventh and said eighth contact areas at least partially corresponding to the position of a positive contact and a negative contact, respectively, of a second energy pack.

9. The cartridge of claim 4, said cartridge further comprising:
a contact arm locatable in a first position substantially parallel to said fourth side wall and a second position substantially parallel to said second side wall, said contact arm having at least a seventh contact area electrically connected to said first contact area, wherein at least one battery cell is locatable between said at least one seventh contact area of said contact arm and at least one of said sixth contact areas located on said second side wall.

10. The cartridge of claim 4, said cartridge further comprising:
a contact arm having a second plurality of seventh contact areas, said contact arm locatable in a first position substantially parallel to said second side wall, wherein a second plurality of battery cells are locatable within the cavity between said contact arm and said second side wall such that a positive and a negative contact on each of the second plurality of battery cells are positionable against one of said seventh and sixth contact areas, respectively, wherein the second plurality of seventh and sixth contact areas are electrically connected such that the second plurality of cells are electrically connected to each other in series, terminating in a positive and a negative contact area electrically connected to said first and said second contact areas, respectively.

11. The cartridge of claim 10, wherein said contact arm is further locatable in a second position substantially parallel to said fourth side wall.

12. A cartridge capable of accommodating either an energy pack or a plurality of individual battery cells to supply energy to an electrical apparatus having a positive contact and a negative contact, said cartridge comprising:
a housing having first, second, third and fourth side walls forming a cavity capable of accommodating the energy pack;

a first and a second contact area located on said housing, the position of said first and said second contact areas corresponding to the position of the positive contact and negative contact, respectively, of the electrical apparatus;

a third and a fourth contact area located on said housing within the cavity, said third and fourth contact areas electrically connected to said first and said second contact areas, respectively, the position of said third and said fourth contact areas corresponding to the position of a positive contact and a negative contact, respectively, of the energy pack locatable within the cavity;

a plurality of fifth contact areas located on said second side wall;

a contact arm having a plurality of sixth contact areas, said contact arm locatable in a first position substantially parallel to said second side wall, wherein a plurality of battery cells are locatable within the cavity between said contact arm and said second side wall such that a positive and a negative contact on each of the plurality of battery cells are positionable against one of said sixth and fifth contact areas, respectively, wherein the plurality of sixth and fifth contact areas are electrically connected such that the plurality of cells are electrically connected to each other in series, terminating in a positive and a negative contact area electrically connected to said first and said second contact areas, respectively; and a locking mechanism for securely positioning said housing to the electrical apparatus.

13. The cartridge of claim 12, wherein said contact arm is further locatable in a second position substantially parallel to said fourth side wall.

14. The cartridge of claim 12, said cartridge further comprising:
a second plurality of seventh contact areas and a second plurality of fifth contact areas located on said first and second side walls, wherein a second plurality of battery cells are locatable within the cavity between said first and second side walls such that a positive and a negative contact on each of the second plurality of battery cells are positionable against one of the second plurality of said seventh and fifth contact areas, respectively, wherein the second plurality of seventh and fifth contact areas are electrically connected such that the second plurality of cells are electrically connected to each other in series, terminating in a positive and a negative contact area electrically connected to said first and said second contact areas, respectively.

15. The cartridge of claim 12, said cartridge further comprising means for recharging an energy pack located in the cavity.

16. The cartridge of claim 12, said cartridge further comprising means for recharging battery cells located in the cavity.

17. The cartridge of claim 12, said cartridge further comprising:
   a seventh and an eighth contact area located on said housing within the cavity, said seventh and eighth contact areas electrically connected to said third and said fourth contact areas, respectively, the position of said seventh and said eighth contact areas at least partially corresponding to the position of a positive contact and a negative contact, respectively, of a second energy pack.

18. A power source cartridge integral with an electrical apparatus operable from a direct current energy source, said power source cartridge capable of accommodating either an energy pack or a plurality of individual battery cells to supply the direct current energy source to the electrical apparatus, said power source cartridge comprising:
   a first, second, third and fourth side wall integral with the electrical apparatus, said side walls forming a cavity capable of accommodating either the energy pack or the plurality of individual battery cells;
   a first and a second contact area located on a first and a second portion, respectively, of the apparatus within the cavity through which direct current energy is capable of being supplied to the apparatus, the position of said first and said second contact areas at least partially corresponding to the position of a positive contact and a negative contact, respectively, of the energy pack locatable within the cavity;
   a plurality of third contact areas and a plurality of fourth contact areas located on said first and second side walls, the plurality of battery cells are locatable within the cavity between said first and second side walls such that a positive and a negative contact on each of the battery cells are positionable against one of the plurality of said third and fourth contact areas, respectively, wherein the plurality of third and fourth contact areas are electrically connected such that the plurality of cells are electrically connected to each other in series, terminating in a positive and a negative contact area electrically connected to said first and said second contact areas, respectively; and
   a device to retain the energy pack or the individual battery cells within the cavity.

19. The power source cartridge of claim 18, said cartridge further comprising:
   a fifth and a sixth contact area located on a third and a fourth portion, respectively, of the apparatus within the cavity, said fifth and sixth contact areas electrically connected to said first and second contact areas, respectively, the position of said fifth and said sixth contact areas at least partially corresponding to the position of a positive contact and a negative contact, respectively, of a second energy pack locatable within the cavity.

20. The power source cartridge of claim 18, said cartridge further comprising:
   a contact arm locatable in a first position substantially parallel to said fourth side wall and a second position substantially parallel to said second side wall, said contact arm having at least a fifth contact area electrically connected to said first contact area, wherein at least one battery cell is locatable between said at least one fifth contact area of said contact arm and at least one of said fourth contact areas located on said second side wall.

21. The power source cartridge of claim 18, said cartridge further comprising:
   a contact arm having a second plurality of fifth contact areas, said contact arm locatable in a first position substantially parallel to said second side wall, wherein a second plurality of battery cells are locatable within the cavity between said contact arm and said second side wall such that a positive and a negative contact on each of the second plurality of battery cells are positionable against one of said fifth and fourth contact areas, respectively, wherein the second plurality of fifth and fourth contact areas are electrically connected such that the second plurality of cells are electrically connected to each other in series, terminating in a positive and a negative contact area electrically connected to said first and said second contact areas, respectively.

22. The power source cartridge of claim 21, wherein said contact arm is further locatable in a second position substantially parallel to said fourth side wall.

23. A power source cartridge integral with an electrical apparatus operable from a direct current energy source, said power source cartridge capable of accommodating either an energy pack or a plurality of individual battery cells to supply the direct current energy source to the electrical apparatus, said power source cartridge comprising:
   a first, second, third and fourth side wall integral with the electrical apparatus, said side walls forming a cavity capable of accommodating either the energy pack or the plurality of individual battery cells;
   a first and a second contact area located on a first and a second portion, respectively, of the apparatus within the cavity through which direct current energy is capable of being supplied to the apparatus, the position of said first and said second contact areas at least partially corresponding to the position of a positive contact and a negative contact, respectively, of the energy pack locatable within the cavity;
   a plurality of third contact areas located on said second side wall;
   a contact arm having a plurality of fourth contact areas, said contact arm locatable in a first position substantially parallel to said second side wall, wherein a plurality of battery cells are locatable within the cavity between said contact arm and said second side wall such that a positive and a negative contact on each of the plurality of battery cells are positionable against one of said fourth and third contact areas, respectively, wherein the plurality of fourth and third contact areas are electrically connected such that the plurality of cells are electrically connected to each other in series, terminating in a positive and a negative contact area electrically connected to said first and said second contact areas, respectively; and a device to retain the energy pack or the individual battery cells within the cavity.

24. The power source cartridge of claim 23, wherein said contact arm is further locatable in a second position substantially parallel to said fourth side wall.

25. The power source cartridge of claim 23, said cartridge further comprising:
a second plurality of fifth contact areas and a second plurality of third contact areas located on said first and second side walls, wherein a second plurality of battery cells are locatable within the cavity between said first and second side walls such that a positive and a negative contact on each of the second plurality of battery cells are positionable against one of the second plurality of said fifth and third contact areas, respectively, wherein the second plurality of fifth and third contact areas are electrically connected such that the second plurality of cells are electrically connected to each other in series, terminating in a positive and a negative contact area electrically connected to said first and said second contact areas, respectively.

26. The power source cartridge of claim 23, said cartridge further comprising:
a fifth and a sixth contact area located on a third and a fourth portion, respectively, of the apparatus within the cavity, said fifth and sixth contact areas electrically connected to said first and second contact areas, respectively, the position of said fifth and said sixth contact areas at least partially corresponding to the position of a positive contact and a negative contact, respectively, of a second energy pack locatable within the cavity.

27. A cartridge capable of accommodating either an energy pack or individual battery cells to supply energy to an electrical apparatus having a positive contact and a negative contact, said cartridge comprising:
a housing having first, second, third and fourth side walls forming a cavity capable of accommodating the enegy pack;
a first and a second contact area located on said housing, the position of said first and said second contact areas corresponding to the position of the positive contact and negative contact, respectively, of the electrical apparatus;
a third and a fourth contact area located on said housing within the cavity, said third and fourth contact areas electrically connected to said first and said second contact areas, respectively, the position of said third and said fourth contact areas corresponding to the position of a positive contact and a negative contact, respectively, of the energy pack locatable within the cavity;
a plurality of fifth contact areas located on said second side wall;
a first contact arm having a plurality of sixth contact areas located on a first side thereof, said first contact arm locatable in a first position substantially parallel to said second side wall, wherein a first plurality of battery cells are locatable within the cavity between said first contact arm and said second side wall such that a positive and a negative contact on each of the first plurality of battery cells are positionable against one of said sixth and fifth contact areas, respectively;
a plurality of seventh contact areas located on said fourth side wall;
a second contact arm having a plurality of eighth contact areas located on a first side thereof, said second contact arm locatable in a first position substantially parallel to said fourth side wall, wherein a second plurality of battery cells are locatable within the cavity between said second contact arm and said fourth side wall such that a positive and a negative contact on each of the second plurality of battery cells are positionable against one of said eighth and seventh contact areas, respectively;
a plurality of ninth contact areas located on a second side of said first contact arm and a plurality of tenth contact areas located on a second side of said second contact arm, wherein a third plurality of battery cells are locatable within the cavity between said first contact arm and said second contact arm such that a positive and a negative contact on each of the third plurality of battery cells are positionable against one of said ninth and tenth contact areas, respectively;
wherein the plurality of fifth, sixth, seventh, eighth, ninth and tenth contact areas are electrically connected such that the first, second and third plurality of cells are electrically connected to each other in series, terminating in a positive and a negative contact area electrically connected to said first and said second contact areas, respectively; and
a locking mechanism for securely positioning said housing to the electrical apparatus.

28. The cartridge of claim 27, wherein said first contact arm is further locatable in a second position substantially parallel to said first side wall.

29. The cartridge of claim 27, wherein said second contact arm is further locatable in a second position substantially parallel to said first side wall.

* * * * *